(12) United States Patent
Schmitz

(10) Patent No.: US 11,701,680 B2
(45) Date of Patent: Jul. 18, 2023

(54) APPLICATION DEVICE FOR A VISCOUS ADHESIVE HAVING A ROTATABLE NOZZLE

(71) Applicant: EXEL Industries SA, Epernay (FR)

(72) Inventor: Markus Schmitz, Paris (FR)

(73) Assignee: EXEL INDUSTRIES SA, Epernay (FR)

( * ) Notice: Subject to any disclaimer, the term of this patent is extended or adjusted under 35 U.S.C. 154(b) by 149 days.

(21) Appl. No.: 17/371,538

(22) Filed: Jul. 9, 2021

(65) Prior Publication Data

US 2022/0016664 A1 Jan. 20, 2022

(30) Foreign Application Priority Data

Jul. 17, 2020 (DE) ..................... 10 2020 119 027.1

(51) Int. Cl.
*B05C 5/02* (2006.01)
*B05B 1/30* (2006.01)
*B05B 13/04* (2006.01)
*B60J 1/00* (2006.01)

(52) U.S. Cl.
CPC .......... *B05C 5/0225* (2013.01); *B05B 1/3066* (2013.01); *B05B 13/0431* (2013.01); *B05C 5/0216* (2013.01); *B60J 1/006* (2013.01)

(58) Field of Classification Search
CPC . B05C 5/0225; B05C 5/0216; B05B 13/0431; B05B 1/3066; B60J 1/006; F16K 41/003
See application file for complete search history.

(56) References Cited

U.S. PATENT DOCUMENTS

| 5,794,825 A | 8/1998 | Gordon et al. | |
| 2005/0095365 A1* | 5/2005 | Acum | B05C 5/0225 118/323 |

FOREIGN PATENT DOCUMENTS

| DE | 9112290 U1 | 11/1991 |
| DE | 69514174 T2 | 8/2000 |

OTHER PUBLICATIONS

German Search Report (1020201190271).

* cited by examiner

*Primary Examiner* — Vishal Pancholi
*Assistant Examiner* — Robert K Nichols, II
(74) *Attorney, Agent, or Firm* — Lott & Fischer, PL

(57) ABSTRACT

An application device for a viscous adhesive comprising a base body having a first inlet for a viscous adhesive; and a nozzle body which is rotatable about an axis with respect to the base body and which surrounds a portion of the base body radially on the outside with respect to the axis, wherein, via the interaction of a first dynamic seal with a separating agent chamber, in which a separating agent is stored, the introduction of humidity into the adhesive before it exits the nozzle opening is effectively prevented.

9 Claims, 3 Drawing Sheets

APPLICATION DEVICE FOR A VISCOUS ADHESIVE HAVING A ROTATABLE NOZZLE

CLAIM OF PRIORITY

This application is being filed as a non-provisional patent application under 35 U.S.C. § 111(a) and 37 CFR § 1.53(b). This application claims priority under 35 U.S.C. § 119(a) to German patent application number 10 2020 119 027.1 filed on Jul. 17, 2020, the contents of which are incorporated herein by reference.

FIELD OF INVENTION

The present invention relates to an application device for a viscous adhesive having a rotatable nozzle, the use of a corresponding application device for applying adhesive, and a corresponding method for applying viscous adhesive. The invention is preferably used for applying polyurethane-based adhesive to a pane, in particular to a window or windshield.

BACKGROUND OF THE INVENTION

Bonding is used as a material joining method in a large number of applications, for example increasingly in the construction of motor vehicles, in which, for example, both body components and panes such as windshields and windows are bonded to other components. Often, adhesives such as polyurethane-based adhesives are used in this case, which react with water and harden. In order to prevent the adhesive from hardening at an unwanted point, a high level of expenditure is often used in terms of equipment in order to prevent the penetration of water, for example as humidity with the ambient air, as far as possible.

Proceeding from this, the present invention is based on the object of at least partially overcoming the disadvantages known from the prior art and, in particular, of specifying an application device for a viscous adhesive which reliably prevents the ingress of humidity into the application device with simple means.

These objects are achieved with the features of the independent claims. The dependent claims are directed in each case to advantageous developments.

SUMMARY OF THE INVENTION

The application device according to the invention for a viscous adhesive comprises a base body having a first inlet for a viscous adhesive and a nozzle body which is rotatable about an axis with respect to the base body and which surrounds a portion of the base body radially on the outside with respect to the axis. The nozzle body has a nozzle channel which has a nozzle opening at a first end for discharging the adhesive from the application device and an inflow entry at a second end. The second end is the other end of the nozzle channel in relation to the nozzle opening. The nozzle body and base body are aligned in such a way that adhesive can be conveyed into the inflow entry of the nozzle channel and thus into the nozzle channel via an orifice of the first inlet, with a first dynamic seal surrounding the base body, which rests with an inner side against an outer wall of the base body and with an outer side against an inner wall of the nozzle body.

A separating agent chamber is formed which surrounds the base body in the circumferential direction and which is delimited radially on the inside by the outer wall of the base body and radially on the outside by the inner wall of the nozzle body. A second inlet for separating agent is formed in the base body and is fluidically connected to the separating agent chamber for feeding separating agent. The first dynamic seal is formed in the direction of the axis between the separating agent chamber and the inflow entry of the nozzle channel of the nozzle body.

A radial outer surface is understood to mean an outer surface of the feed line extension or of the base body (in the region of the separating agent chamber, which extends in the circumferential direction, preferably a cylindrical surface which, viewed radially, lies on the outside. A radially inner surface of the nozzle body is understood to mean a surface which extends in the circumferential direction with respect to the axis, preferably a cylindrical surface which, viewed radially, lies on the inside. A hydrophobic, preferably viscous, substance is used as the separating agent. A fat and/or an oil is preferably used as the separating agent, which forms a separating layer and thus a barrier to water, so that the separating agent in the separating agent chamber prevents or at least significantly slows the penetration of air with humidity through the sealing points of the first dynamic seal. A lubricating grease is preferably used as the separating agent, in particular comprising at least one paraffin, at least one olefin, at least one saturated naphthene, at least one partially unsaturated naphthene, and/or at least one aromatic compound. Alternatively or additionally, a phenyl alkanesulfonate, in particular a ($C_{10}$-$C_{21}$) alkanesulfonic acid phenyl ester, is used as the separating agent.

The adhesive is a viscous liquid with viscosities higher than that of water at a temperature of 21° C. A hydrophilic adhesive, in particular a polyurethane-based adhesive, is preferably used as the adhesive. The application device is particularly preferably used for applying moisture-hardening one-component polyurethane adhesives, in particular for permanently elastic pane and structural bonds (also with at least one further component such as a booster component). The adhesive is preferably thixotropic, so that the adhesive is initially dimensionally stable after application, deforms when the components to be bonded are pressed, and then retains its shape again until the adhesive hardens. This is particularly advantageous when bonding fragile components such as glass and/or plastics panes, in particular in automobile construction.

In one embodiment, a feed line extension can be formed which forms an end region of the base body only comprises the first supply line, not the second supply line or the discharge line, so that the first feed line projects beyond the second feed line and the discharge line. In this example, an orifice of the first inlet is to be formed in the region of the feed line extension. It is thus possible to introduce the separating agent supplied through the second feed line into the separating agent chamber. As a result, the separating agent in the separating agent chamber effectively protects the first dynamic seal against the ingress of air with the corresponding atmospheric humidity. The nozzle body rotates relative to the base body during operation; the adhesive is conveyed via the first feed line in the base body into the nozzle body, in particular into a nozzle channel of the nozzle body, from which the adhesive is directed into a nozzle and exits again through a nozzle opening. Therefore, the formation of the first dynamic seal as the only dynamic seal is sufficient to seal the only interface via which air can be fed to the adhesive relative to the base body due to the rotating design of the nozzle body. This allows the application device to be designed in a simple manner in terms of equipment design, while at the same time providing a high level of process reliability against undesired hardening of the adhesive.

Due to the rotatability of the nozzle body with respect to the base body, the discharge of adhesive can be adapted, in particular with regard to the direction of discharge. Often, a region of a component has to be provided with adhesive, for example if a first component is to be connected to a second component in a specific connection region. In this case, the adhesive is to be applied to one of the components in the connection region, whereupon the first component and the second component are brought into contact in the connection region in such a way that the adhesive creates a material connection between the first component and the second component. For this purpose, it is usually necessary to provide a bead of adhesive onto a surface in the connection region. In order to form this bead, the application device must be moved relative to the component. In order to be able to form a defined bead of adhesive, a specific orientation of the nozzle opening is necessary in each case; in particular, the nozzle opening of the nozzle body must be oriented opposite to the direction of movement of the application device towards the component. This is made possible by the rotatability of the nozzle body relative to the base body.

The application device can be fixed to a stand, the component moving relative to the stand and thus to the application device, and it can also be mounted on a manipulator arm or robot arm that allows the application device to move relative to the component. The rotation of the nozzle body relative to the base body is ensured by a corresponding drive. Since, for example, a component with a complex geometry has to be provided with adhesive, it is advantageous if this drive allows for a rotation in a wide angular range, for example up to 360°, in particular up to 450°.

An outlet is advantageously formed in the base body, which is in fluid communication with the separating agent chamber. By means of the outlet, it is thus possible to discharge separating agent from the separating agent chamber. This can be done continuously or discontinuously and thus allows on the one hand for continuous rinsing of the separating agent chamber with fresh separating agent and on the other hand also a discontinuous exchange of separating agent in the separating agent chamber if it has been in the separating agent chamber for a specific time, for example. In this way, the accumulation of contamination in the separating agent can be avoided.

The outlet preferably runs parallel to the axis. This allows for a compact construction of the base body having an outlet. It is also preferred if at least one of the following inlets: a) the first inlet and b) the second inlet run parallel to the axis. This also allows for a compact construction of the base body. The compact design of the base body allows for a weight-reduced design of the application device, which then places lower demands on the mechanics that move it, for example a manipulator arm or robot arm.

A second dynamic seal is preferably formed on one side of the separating agent chamber which is opposite the side of the separating agent chamber facing the first dynamic seal. The second dynamic seal prevents separating agent from escaping from the separating agent chamber.

At least one of the following seals is preferred: a) the first dynamic seal and b) the second dynamic seal designed as an O-ring or, preferably, as a rotary seal A rotary seal is understood to mean, in particular, a seal through which a rotating component, such as the nozzle body in this case, can be sealed as intended from another component that does not rotate or rotates at a different rotational frequency, such as the base body in this case. A rotary seal also includes, in particular, a radial shaft seal, an axial shaft seal, a mechanical seal, and/or a protective contact seal, for example a felt ring, a sealing washer, piston rings, a V-ring, an axial shaft seal, a rod seal, a piston seal, and/or a wiper.

At least one of the named dynamic seals is particularly preferably designed as a V-ring with a collar. This can be fixed by clamping its collar in such a way that it has to rotate in the same way as the nozzle body. This creates a single point of movement between the base body and the seal. Usually, no high pressures arise in the region of the sealing point. In this case, the V-ring seals by its own preload (usually applied by a metal spring). If the nozzle becomes clogged, the pressure can increase. The seal can cope with this, as the adhesive pressure also increases the contact pressure of the seal on the external components.

Furthermore, a use of an application device according to the present invention for applying adhesive to a surface to be bonded is proposed. The adhesive preferably comprises a polyurethane-based adhesive.

Furthermore, a method for applying an adhesive to a pane, in particular a windshield or window, is proposed having an application device according to the present invention, wherein adhesive is fed into the nozzle channel via the first inlet and is conveyed out of this through a nozzle opening onto the pane and a bead of adhesive is produced on the pane by a movement of the application device relative to the pane in a direction of movement, wherein the nozzle body is rotated relative to the base body of the application device in such a way that the nozzle opening is oriented opposite to the direction of movement.

The adhesive preferably comprises a polyurethane-based adhesive. In particular, the adhesive is a thixotropic adhesive that hardens with the aid of air humidity or a booster component. The pane is preferably a pane for use in automobile construction, in particular as a window pane. The pane is preferably a windshield, the pane of a side window, or a rear window of a motor vehicle.

By means of the method according to the invention, it is possible to achieve a defined application of adhesive on panes of even complex geometries, in particular in the edge region of the pane for bonding to other components, for example body components, and thus to achieve a defined material connection with other components.

The invention and the technical environment will be explained in more detail with reference to the figures. It should be noted that the invention should not be limited by the exemplary embodiments shown. In particular, unless explicitly stated otherwise, it is also possible to extract partial aspects from the facts explained in the figures and to combine them with other components and/or insights from other figures and/or from the present description. It is noted that the figures and in particular the depicted size ratios are only schematic. Identical reference signs denote identical objects, so that explanations from other figures can be used in a supplementary manner, if necessary.

DETAILED DESCRIPTION OF THE INVENTION

Figure 1:
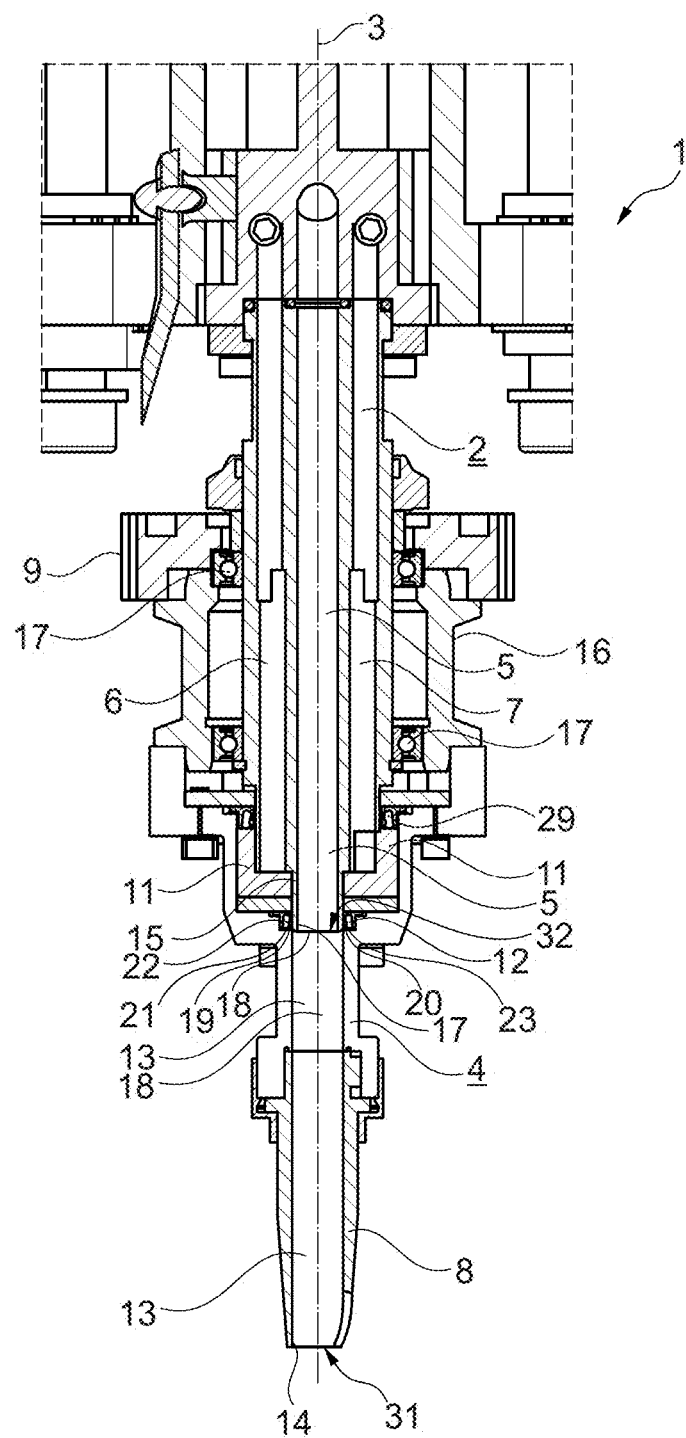
FIG. 1 shows a first cross section through an embodiment of an application device in accordance with the present invention.

For purposes of clarity and ease of reference, following is a description of various components shown in the drawings and their corresponding reference designations:

1 Application device
2 Base body
3 Axis
4 Nozzle body
5 First inlet
6 Second inlet
7 Outlet
8 Nozzle
9 Gear
10 Drive
11 Separating agent chamber
12 First dynamic seal
13 Nozzle channel
14 Nozzle opening
15 Outer wall
16 Bearing sleeve
17 Feed line extension
18 Orifice
19 Inflow entry
20 Inner side
21 Outer surface
22 Outer side
23 Inner wall
24 Feed line
25 Valve
26 Adhesive
27 Windshield
28 Direction of movement
29 Second dynamic seal
30 Surface
31 First end
32 Second end FIG. 1 is a first cross section through an example of an application device 1 for viscous adhesive. The application device 1 comprises a base body 2 and a nozzle body 4 rotatable about an axis 3 with respect to the base body 2. The base body 2 contains all the feed lines for the media necessary for operating the application device 1. In the present example, a one-component adhesive, in particular a polyurethane-based adhesive, is used, which is fed via a first inlet 5 through the base body 2 to the nozzle body 4. In the case of a two-component adhesive, the base body 2 has two first inlets 5 (not shown in this case), which guide the individual components of the adhesive to the nozzle body 4. In the present example, the first inlet 5 extends in the direction of the axis 3 centrally in the base body 2 and is aligned with the nozzle body 4. The base body 2 also has a second inlet 6, which also extends in the direction of the axis 3 and thus runs parallel to the first inlet 5. A separating agent, in particular a fat, is fed via the second inlet 6. Used separating agent is discharged via an outlet 7. The outlet 7 is aligned parallel to the axis 3.

The nozzle body 4 has an exchangeable nozzle 8 which can be adapted to the application and which is easily exchangeable. The interface between the nozzle 8 and the rest of the nozzle body 4 is statically sealed and designed in such a way that no outside air can enter the nozzle channel 13. The nozzle body 4 has a nozzle channel 13 which also extends into and through the nozzle 8, via which the adhesive is guided to a nozzle opening 14 of the nozzle 8 and is discharged through it. The nozzle body 4 extends in the direction of the axis 3 over a portion of the base body 2 and surrounds this portion coaxially. The nozzle body 4 is connected to a gear wheel 9, which is part of a drive 10, by means of which the nozzle body 4 can be rotated relative to the base body 2 about the axis 3.

The nozzle body 4 has a separating agent chamber 11 which can be rotated with the nozzle body 4. In operation, the separating agent chamber 11 is filled with the separating agent. For this purpose, the second inlet 6 opens into the separating agent chamber 11. Used separating agent can be removed again via the outlet 7, which is also connected to the separating agent chamber 11. In this case, it is possible to fill the separating agent chamber 11 before the start of operation of the application device 1 and to renew the filling of the separating agent chamber 11 discontinuously, in which fresh separating agent is pressed through the second inlet 6 into the separating agent chamber 11 and thus used separating agent is fed out of the separating agent chamber 11 into the outlet 7. Alternatively, during operation of the application device 1, separating agent can be continuously fed via the second inlet 6 into the separating agent chamber 11 and from this into the outlet 7. The outlet 7 is connected to a receptacle (not shown in this case) for used separating agent. Whether a continuous or discontinuous filling process of the separating agent chamber 11 takes place is decided in particular depending on the requirements of the adhesive and the application.

The nozzle body 4 is sealed off from the base body 2 via a first dynamic seal 12. The first dynamic seal 12 is designed in particular as a rotary seal. The first dynamic seal 12 surrounds the base body 2, in this example in the region of a feed line extension 17, which includes a part of the first inlet 5. The nozzle channel 13 has a nozzle opening 14 at a first end 31 for discharging the adhesive from the application device 1 and an inflow entry 19 at a second end 32 which is opposite the first end 31, nozzle body 4 and the base body 2 are aligned in such a way that adhesive can be conveyed into the inflow entry 19 of the nozzle channel 14 via an orifice 18 of the first inlet 5 which is designed in this example in the feed line extension 17. Preferably, and in this example, the orifice 18 of the first inlet 5 and inflow entry 19 of the nozzle channel 13 are at least partially, preferably completely, overlapping in a plane perpendicular to the axis 3. The first dynamic seal 12 rests with an inner side 20 against an outer surface 21 of the base body 2 in the region of the feed line extension 17 and with an outer side 22 against an inner wall 23 of the nozzle body 4 (see FIG. 3 in detail). During operation, adhesive is conveyed through the first inlet 5 in the feed line extension 17 through the orifice 18 into the inflow entry 19 and thus into the nozzle channel 13.

The first dynamic seal 12 is not completely tight due to the system design and would allow air with the corresponding humidity to penetrate through the first dynamic seal 12 into the nozzle channel 13 of the nozzle body 4, so that there could be an undesirable reaction with the adhesive. PU-based adhesives in particular are hygroscopic and harden in reaction with water.

In order to restrict hardening to the adhesive discharged through the nozzle opening 14 and to prevent undesired hardening, the second inlet 6 opens into a separating agent chamber 11, so that separating agent can be fed into the separating agent chamber 11 via the second inlet 6. The first dynamic seal 12 is formed in the direction of the axis 3 between the separating agent chamber 11 and the nozzle channel 14 of the nozzle body 4. The separating agent chamber 11 is thus in the only region via which air can reach the transition from the first inlet 5 to the nozzle channel 13.

The separating agent chamber 11 completely surrounds the base body 2 in the circumferential direction in relation to the axis 3 and is delimited radially on the inside by an outer wall 15 of the base body 2 and radially on the outside by an inner wall 23 of the nozzle body 4, so that the separating agent rests against the outer wall 15 of the base body 2. This prevents air from penetrating towards the first dynamic seal 12 and thus prevents air from penetrating into the nozzle channel 13. In this way, undesired hardening in the nozzle channel 13 can be prevented. In this case, the first dynamic seal 12 is the only seal that prevents air from penetrating into the nozzle channel 13. The separating agent chamber 11 rotates with the nozzle body 4 around the base body 2.

The only interface is located between an orifice 18 of the first inlet 5 in the feed line extension 17 and a rotatable inflow entry 19 of the nozzle channel 13 (see also the detail drawing in FIG. 3), through which interface air can reach the adhesive before it exits the nozzle opening 14. The first dynamic seal 12 is formed in the direction of the axis 3 between the separating agent chamber 11 and the inflow entry 19 into the nozzle channel 13. Therefore, the dynamic seal 12, in cooperation with the separating agent chamber 11, ensures that no air comes into contact with the adhesive in the interior of the nozzle body 4.

The nozzle body 4 is attached in a rotationally fixed manner to a bearing sleeve 16 which coaxially surrounds a portion of the base body 2 and which is mounted on the base body 2 via ball bearings 17. The gear 9 is non-rotatably fixed on the bearing sleeve 16. By actuating the gear 9, for example by means of a further gear meshing with it or also by means of a toothed rack as part of the drive 10, the bearing sleeve 16 and thereby the nozzle body 4 and thus the nozzle opening 14 are rotated relative to the base body 2. This makes it possible, for example when applying adhesive to a windshield, to rotate the nozzle body 4 in each case so that the nozzle opening 14 is optimally aligned with the application direction of the adhesive on the windshield.

The application device 1 can be connected to a manipulator or robot arm as well as to a tripod.

Furthermore, a second dynamic seal 29 is formed on one side of the separating agent chamber 11 which is opposite the side of the separating agent chamber 11 facing the first dynamic seal 12. The second dynamic seal 29 prevents the separating agent from escaping from the separating agent chamber 11 and at least slows down the contamination of the separating agent in the separating agent chamber 11. This makes it possible to use the separating agent in the separating agent chamber 11 for a longer period of time. Furthermore, by preventing air from entering the separating agent in the separating agent chamber 11, the accumulation of moisture in the separating agent is slowed down or reduced.

Figure 2:
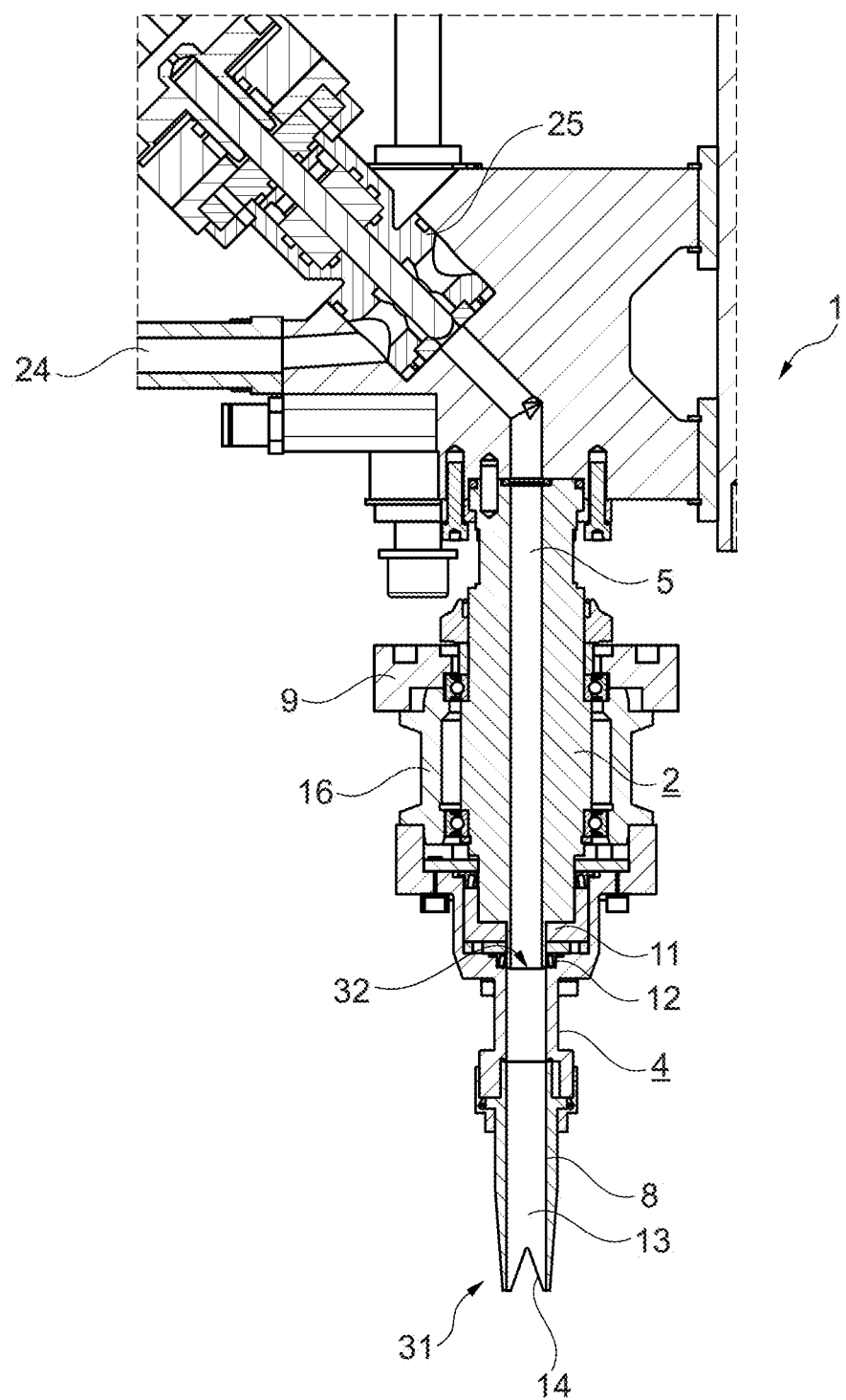
FIG. 2 shows a second cross section through the embodiment of the application device in accordance with the present invention shown in FIG. 1.

FIG. 2 is a second cross section of the example of the application device 1. To avoid repetition, reference is made here to the description of the first cross section of FIG. 1 and only the further details are explained. FIG. 2 shows the feed line 24 for adhesive, via which the adhesive can be supplied to the first feed line 5 via a valve 25. The nozzle opening 14 has a triangular cross section, so that a bead of adhesive with a triangular cross section can be applied by the application device 1.

Figure 3:
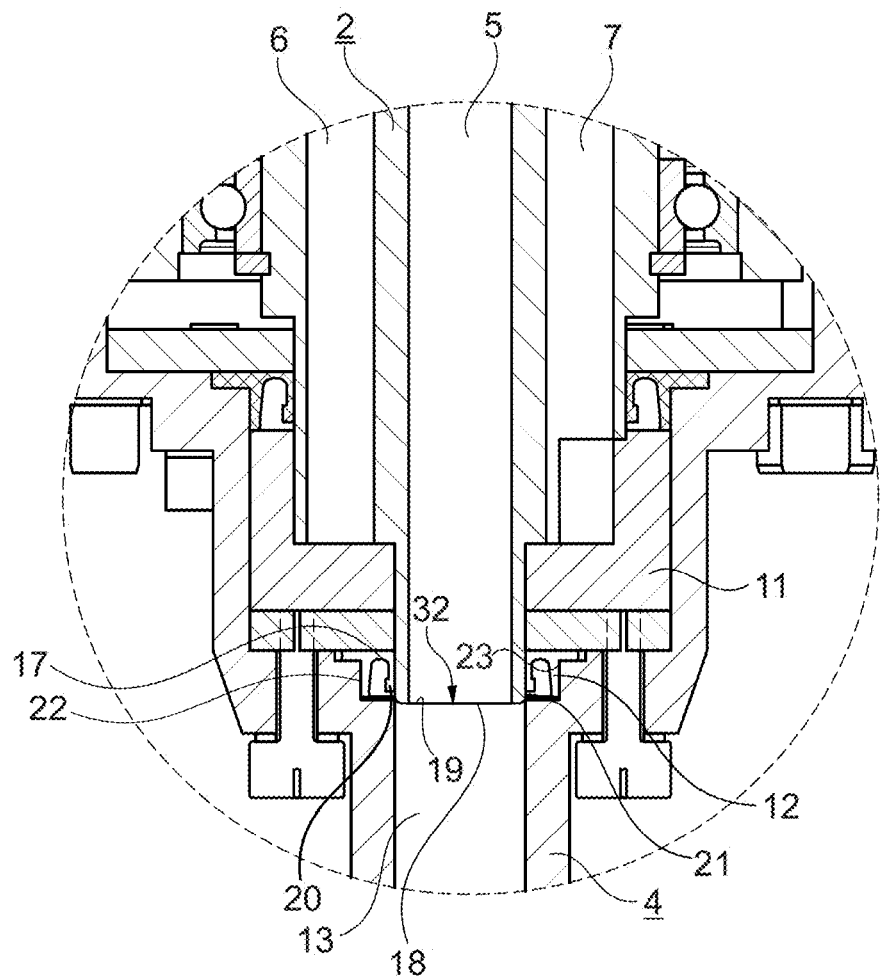
FIG. 3 shows a detail of the embodiment of the application device in accordance with the present invention shown in FIG. 1.

FIG. 3 is an enlarged detail of the application device 1 with the first dynamic seal 12 surrounding the feed line extension 17. The first dynamic seal 12 rests with an inner side 20 against an outer surface 21 of the feed line extension 17 and with an outer side 22 against the inner wall 23 of the nozzle body 4.

Figure 4:
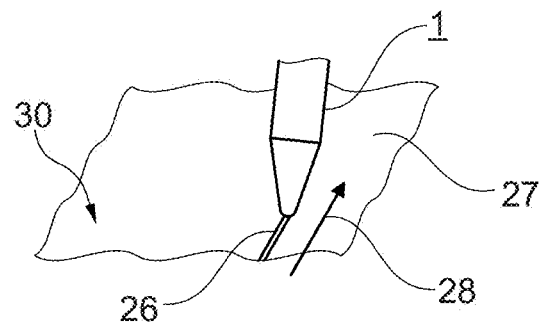
FIG. 4 shows the application of an adhesive to a windshield using an embodiment of an application device in accordance with the present invention.

FIG. 4 shows, very schematically, an example of the application of adhesive 26 to a surface 30 of a windshield 27 by means of an application device 1. In this case, the application device 1 is moved in a direction of movement 28 relative to the windshield 27. The nozzle body 4 is rotated relative to the base body 2 in such a way that the nozzle opening 14 (not shown in this case) is oriented opposite to the direction of movement 28. In addition, the rotatability of the nozzle body 4 relative to the base body 2 allows for a seam closure to be achieved in which the end of the bead of adhesive 26 is connected to the beginning of the corresponding bead, for example if the windshield 27 is provided with adhesive 26 over the entire outer edge.

The application device 1 allows the application of polyurethane-based adhesive to a surface, wherein, via the interaction of a first dynamic seal 12 with a separating agent chamber 11, in which a separating agent is stored, the introduction of humidity into the adhesive before it exits the nozzle opening 14 is effectively prevented. The outlay on equipment required for this purpose is low when using the formation of a first dynamic seal 12 and a separating chamber 11.

I claim:

1. An application device for a viscous adhesive comprising:
    a base body having a first inlet for a viscous adhesive; and
    a nozzle body which is rotatable about an axis with respect to the base body and which surrounds a portion of the base body radially on the outside with respect to the axis;
    wherein the nozzle body has a nozzle channel which has a nozzle opening at a first end for discharging the adhesive from the application device and an inflow entry at a second end;
    wherein the nozzle body and the base body are aligned in such a way that adhesive can be conveyed into the inflow entry of the nozzle channel via an orifice of the first inlet;
    wherein a first dynamic seal covers the base body, which rests with an inner side against an outer wall of the base body and with an outer side against an inner wall of the nozzle body;
    wherein a separating agent chamber is formed which surrounds the base body in the circumferential direction and which is delimited radially inside by the outer wall of the base body and radially outside by the inner wall of the nozzle body;
    wherein a second inlet for a separating agent is formed in the base body, which is fluidically connected to the separating agent chamber for feeding the separating agent;
    wherein the first dynamic seal is formed in the direction of the axis between the separating agent chamber and the inflow entry of the nozzle channel of the nozzle body; and
    wherein an outlet is formed in the base body and is in fluid communication with the separating agent chamber.

2. An application device in accordance with claim 1 wherein the outlet runs parallel to the axis.

3. An application device in accordance with claim 1 wherein at least one of the first inlet and the second inlet runs parallel to the axis.

4. An application device in accordance with claim 1 wherein a second dynamic seal is formed on one side of the separating agent chamber which is opposite the side of the separating agent chamber facing the first dynamic seal.

5. A method for applying an adhesive to a surface to be bonded comprising the use of an application device in accordance with claim 1.

6. The method for applying an adhesive to a surface to be bonded in accordance to claim 5, wherein the adhesive is a polyurethane-based adhesive.

7. The method for applying an adhesive to a surface to be bonded in accordance to claim 5, wherein the surface comprises a windshield;
the adhesive is fed into the nozzle channel via the first inlet and is conveyed out of the nozzle channel through a nozzle opening onto the windshield and a bead of adhesive is produced on the windshield by a movement of the application device relative to the windshield in a direction of movement; and
the nozzle body is rotated relative to the base body of the application device in such a way that the nozzle opening is oriented opposite to the direction of movement.

8. The method for applying an adhesive to a surface to be bonded in accordance to claim 7, wherein the adhesive is a polyurethane-based adhesive.

9. The method for applying an adhesive to a surface to be bonded in accordance to claim 7, wherein the adhesive is a thixotropic, water-hardening adhesive.

* * * * *